(12) United States Patent
Weber et al.

(10) Patent No.: US 10,687,592 B2
(45) Date of Patent: Jun. 23, 2020

(54) WOVEN DISPLAY

(71) Applicant: Apple Inc., Cupertino, CA (US)

(72) Inventors: Douglas J. Weber, Cupertino, CA (US); Teodor Dabov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 15/384,147

(22) Filed: Dec. 19, 2016

(65) Prior Publication Data

US 2017/0095043 A1    Apr. 6, 2017

Related U.S. Application Data

(63) Continuation of application No. 14/292,607, filed on May 30, 2014, now Pat. No. 9,521,885.

(51) Int. Cl.
A44C 5/00 (2006.01)
D03D 1/00 (2006.01)
G04G 17/00 (2013.01)
F21V 8/00 (2006.01)
G04G 9/00 (2006.01)

(52) U.S. Cl.
CPC .................. *A44C 5/00* (2013.01); *D03D 1/00* (2013.01); *G02B 6/0001* (2013.01); *G02B 6/001* (2013.01); *G04G 9/00* (2013.01); *G04G 17/00* (2013.01); *Y10T 29/49119* (2015.01)

(58) Field of Classification Search
None
See application file for complete search history.

(56) References Cited

U.S. PATENT DOCUMENTS

| | | | |
|---|---|---|---|
| 6,158,884 A | 12/2000 | Lebby et al. | |
| 2004/0066659 A1 | 4/2004 | Mezei et al. | |
| 2006/0005361 A1 | 1/2006 | O'Banion | |
| 2007/0037462 A1* | 2/2007 | Allen | D03D 15/00 442/5 |
| 2007/0103928 A1 | 5/2007 | Goossen et al. | |
| 2007/0194066 A1 | 8/2007 | Ishihara et al. | |
| 2008/0004510 A1* | 1/2008 | Tanzawa | A44C 5/0015 600/301 |
| 2011/0309768 A1 | 12/2011 | Peng et al. | |
| 2013/0010004 A1* | 1/2013 | Ligorano | G02B 6/04 345/690 |
| 2013/0333418 A1 | 12/2013 | Anger | |
| 2014/0041772 A1* | 2/2014 | Hayes | A45C 3/06 150/106 |

FOREIGN PATENT DOCUMENTS

| | | |
|---|---|---|
| CN | 1325041 A | 12/2001 |
| CN | 2466691 Y | 12/2001 |
| CN | 102252217 A | 11/2011 |
| CN | 102804811 A | 11/2012 |

(Continued)

*Primary Examiner* — Shawn Mckinnon
(74) *Attorney, Agent, or Firm* — Morgan, Lewis & Bockius LLP

(57) ABSTRACT

A woven fabric includes light transmissive fibers woven into the fabric to provide a visual display. The fabric may be used as a tether to releasably connect a portable electronic device to a user. The light transmissive fibers may transmit light to convey information to the user. The fabric may also be used as part of the housing of an electronic device.

16 Claims, 13 Drawing Sheets

(56) References Cited

FOREIGN PATENT DOCUMENTS

| | | |
|---|---|---|
| JP | 2000-148290 A | 5/2000 |
| JP | 2004-048181 A | 3/2004 |
| JP | 2006-200909 A | 8/2006 |
| JP | 2013-186815 A | 9/2013 |
| JP | 2013-191210 A | 9/2013 |
| KR | 1020120076950 | 7/2012 |

* cited by examiner

WOVEN DISPLAY

CROSS-REFERENCE TO RELATED APPLICATION

This application is a continuation of and claims priority to U.S. application Ser. No. 14/292,607, filed May 30, 2014, which is incorporated herein in its entirety by reference thereto.

FIELD

The disclosed embodiments relate to the field of woven fabric displays. More particularly, the embodiments relate to woven bands which include fibers having varying optical properties. In still greater particularity, the embodiments include light pipe fibers woven into the fabric as light guides to visually display indications or messages to a user of a portable electronic device.

BACKGROUND

Weaving is a method of fabric production in which individual threads or yarns are woven into a fabric or cloth material. Weaving has been an art form known for millennia. In modern times, weaving machines have taken the place of more traditional hand woven fabrics. Generally, two fiber types are woven together such as is shown in FIG. 1. A warp fiber 11 is shown extending longitudinally or vertically while a weft fiber 12 is shown woven horizontally or laterally to form a woven article 13. This type of weaving is generally known in the art. Tools such as weaving, braiding and knitting may be used to intertwine fibers. Fibers that may be intertwined include polymer, metal, insulator—coated metal fibers, glass fibers or other suitable fibers.

Light tubes or light pipes are optical waveguides used for transporting or distributing natural or artificial light for the purpose of illumination. Light pipes may be divided into two broad categories: hollow structures that contain the light with a reflective lining; and transparent solids that contain the light by total internal reflection such as an optical fiber. Some optical fibers transport as much light as possible within the core while optical fibers intended for light distribution are designed to let part of the light leak out through the walls of the fibers. Molded plastic light pipes or tubes are commonly used in the electronics industry to direct illumination from LED's on a circuit board to indicator symbols or buttons on the electronic device.

Modern portable electronic devices may be carried by a user or they may be removably attached to the person of a user by means of straps or other tethers which may be decorative tethers. These tethers prevent the user from dropping or losing the device and function as a convenience to the user. While useful for such purposes, these tethers are generally decorative and serve no useful information providing, or other utilitarian, function other than for aesthetic purposes.

SUMMARY

The disclosed embodiments relate to fabric materials formed from fibers, and to ways in which to form woven fabric materials into bands and other devices to be used with electronic devices. Modern weaving, braiding, and knitting equipment can be used to create fabric materials that would be difficult or impossible to implement using other fabrication technologies. For example, in addition to creating flexible fabric bands which may act as tethers, woven fiber sheets may be used to form carrying structures or pouches for electronic devices. Flexible materials for covering cable sheaths may be formed using fiber weaving tools. Flexible sheets for medical applications may be formed from fiber sheets. For example, flexible carrying devices for transporting medical equipment or objects may be formed from fibers and visual indicia on those carrying devices used to indicate the type or state of electronic equipment contained therein.

The disclosed embodiments incorporate light pipe fibers into woven fabric, such as a tether or wrist band, used with an electronic device. The light pipes receive light from LED's in the electronic device at the point of connection of the fabric to the electronic device such that the light pipes can function as an electronic display on the band. Light pipe fibers such as clear nylon fibers may be interwoven into a flexible material to create a pliable display which may be worn by the user and could provide certain information such as keeping time without turning on the electronic device. The disclosed embodiments may be used with various portable electronic devices including electronic wrist watches, smartphones, laptop computers and computer tablets.

Information could also be provided on the material such as an indication of a message waiting or other information about the condition of the electronic device associated with the band or tether. The band could indicate by a change in color whether the clasp or other implement attaching the band to the person of the user is closed or otherwise secured. The band could indicate if the band ends are properly aligned to the person of the user. If the band is worn by different users, the display on the band could indicate by visual means the size of the band such that a particular user could easily know which portion of the clasp or other securing device to engage to comfortably secure the electronic device to his or her person.

The disclosed embodiments provide a user with a functional as well as aesthetically pleasing attachment means to secure an electronic device to his or her person or to otherwise transport a portable electronic device. Thus, while providing attachment of the device to the person or providing means to transport the device, the tether may provide useful information relating to the electronic device, the functions provided by the electronic device and the attachment tether itself. In alternate embodiments, the material may find for use with electronic devices in other applications such as with medical equipment or the material may be incorporated into the housing as part of the electronic device.

BRIEF DESCRIPTION OF THE DRAWINGS

The disclosure will be readily understood by the following detailed description in conjunction with the accompanying drawings, wherein like reference numerals designate like structural or other elements throughout the various figures, and in which.

DETAILED DESCRIPTION

Reference will now be made in detail to representative embodiments illustrated in the accompanying drawings and in particular with reference to FIGS. 1-14. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. Those skilled in the art will readily appreciate that the detailed description given herein with respect to these Figures is for explanatory purposes only and should not be construed as limiting.

Figure 1:
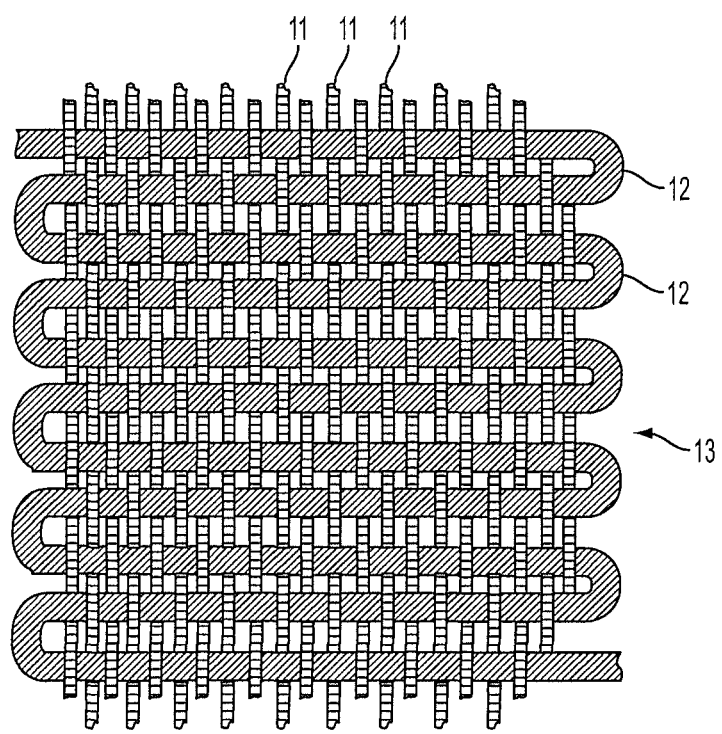
FIG. 1 shows a prior art woven material.
Figure 2:
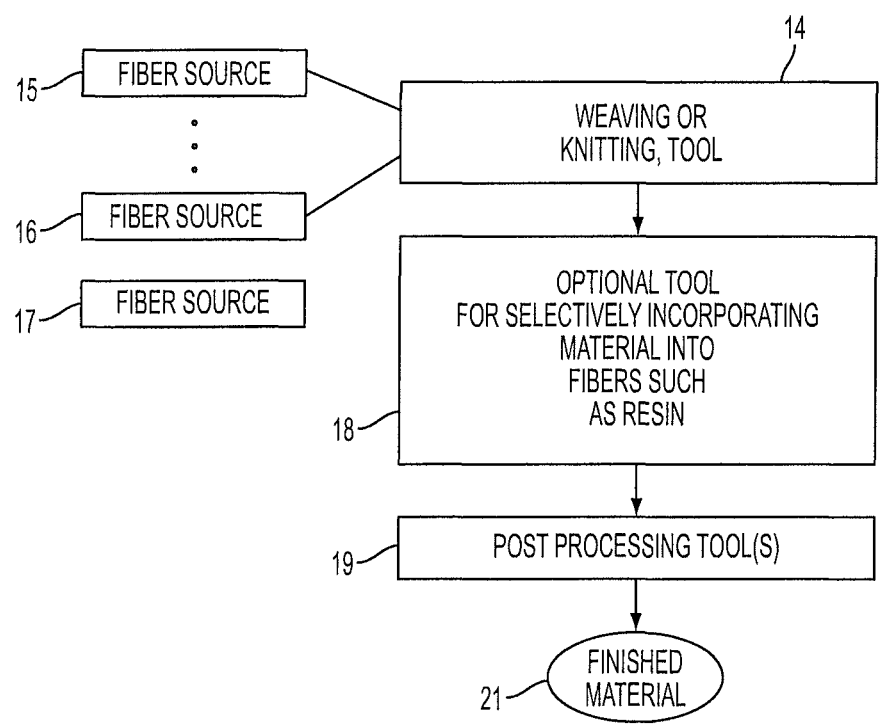
FIG. 2 is a schematic diagram of fabrication equipment that may be used to weave fibers according to one embodiment.

A schematic diagram of a weaving system that may be used to weave fibers in accordance with one embodiment is shown in FIG. 2. Fabrication equipment may be used to weave fiber materials for any suitable purpose or device. Examples in which the weaving equipment is used to weave fabrics for use with electronic devices such as electronic device housings, tethers, wrist bands, and other electronic equipment are described herein. In general, however, the weaving equipment may be used to form any suitable materials for portable electronic devices in computing, communications, medical applications, for industrial equipment, or for any other mechanical structures with surfaces which may benefit from the use of such materials. Weaving equipment 14 is supplied with fiber from fiber sources 15, 16, 17 and may include a weaving or knitting tool. An optional tool 18 may incorporate resin or other material into the woven material to produce a solid material such as a housing cover. Post processing equipment 19 may be used to produce finished material 21 which in one embodiment, is a flexible band material.

As shown in FIG. 2, weaving equipment 14 may be provided with fibers from various fiber sources 15, 16, and 17. Fiber sources 15, 16, 17 may provide fibers of any suitable type and the type and amount of fibers may be varied according to the desired characteristics. Examples of fibers 15, 16, 17 include metal fibers (e.g., strands of steel or copper), glass fibers (e.g., fiber-optic fibers that can internally convey light through total internal reflection), plastic fibers, etc. Some fibers may be included to exhibit high strength (e.g., polymers such as aramid fibers). Other fibers such as nylon may offer good abrasion resistance or be highly flexible (e.g., to stretch without exhibiting plastic deformation). The fibers provided by sources may be magnetic fibers, conducting fibers, insulating fibers, or fibers with other material properties. Fibers may be relatively thin such as carbon nanotubes or carbon fiber or may be thicker such as, for example, metal wire. The fibers provided by sources 15, 16, 17 may be smaller fibers sometimes referred to as filaments or may be provided from sources such as unitary fibers of a single untwisted individual makeup (i.e. whether thick, thin, or twisted or otherwise formed from smaller fibers). The strands of material from fiber sources 15, 16, 17 are referred to herein as fibers. The fiber from sources 15, 16, 17 may also sometimes be referred to as cords, threads, ropes, yarns, filaments, strings, twines, and so on, and may be made from a variety of materials, including dissimilar or different materials.

Figure 3:
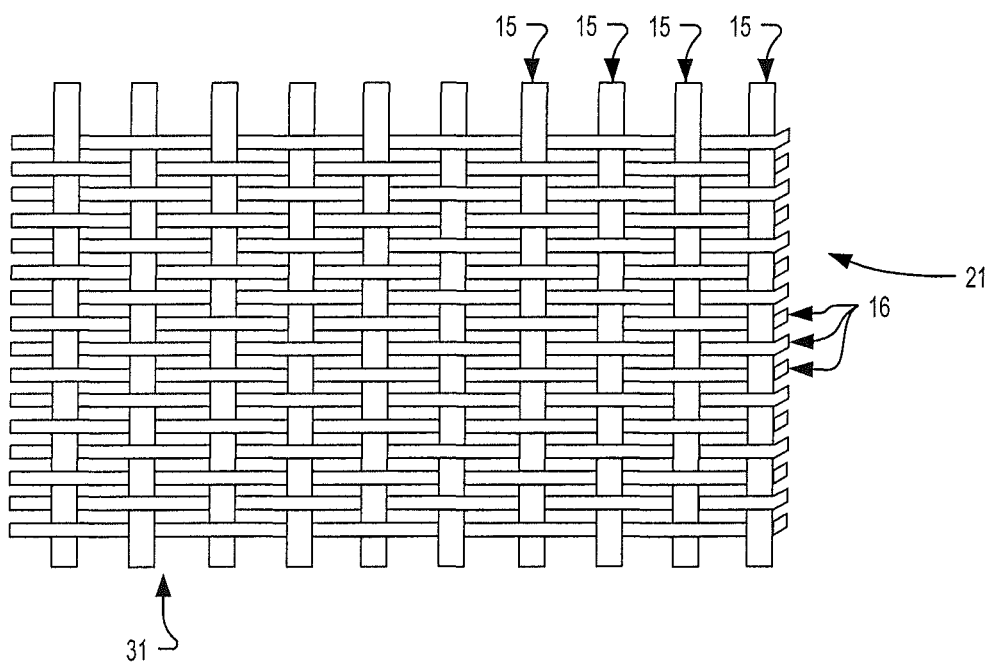
FIG. 3 shows woven flexible material produced by the equipment of FIG. 2.

Weaving tool(s) 14 may be based on any suitable fiber weaving technology. For example, weaving or knitting equipment 14 may include computer-controlled weaving tools, and/or computer-controlled knitting equipment (e.g., three-dimensional knitting tools capable of producing flexible fiber band materials that may have two or more different types of fibers such as light guiding fibers 15, non-light guiding fibers 16 and filler fibers 17. Referring to FIG. 3, a woven flexible material 21 produced by the equipment described in FIG. 2 is shown. Flexible material 21 includes light transmissive fibers 15 in the warp and opaque fibers 16 in the weft. In this example, there are more of fibers 16 in the weft than light transmissive fibers 15 in the warp. However, in some embodiments in may be desirable to have fibers 15 more prevalent than fibers 16. This type of spatial variation of fiber type allows the properties of fabric material 21 to be spatially adjusted during weaving with equipment 14. In one alternate embodiment, light transmissive fibers 15 are included in the weft and opaque fibers 16 are included in the warp. With equipment 14 of FIG. 2, three-dimensional (3D) knitting equipment or other weaving tools can be used to form a fiber material layer 21 that has the desired light transmitting properties depending upon the application.

Figure 4:
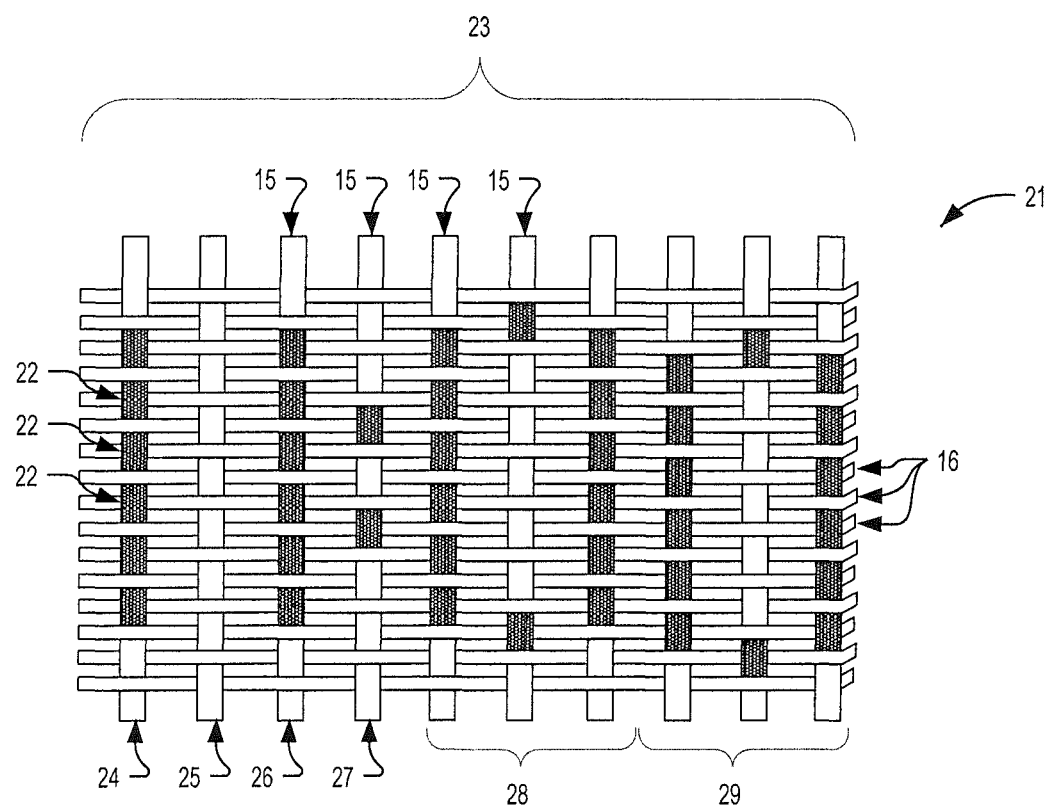
FIG. 4, shows woven fabric of FIG. 3 with certain light pipe fibers energized to form a display.

Referring to FIG. 4, the flexible woven fabric 21 of FIG. 3 is shown with certain light transmissive areas 22 of light pipe fibers 15 energized to form a display 23. Light pipe fibers 15 may be connected to light sources such as LEDs as will be further described herein. By selectively displaying lighted transmissive portions 22 of fibers 15, display 23 may convey information to an observer. The light pipe fibers may be woven between adjacent opaque fibers, such that it passes above one opaque fiber and below the adjacent fiber as shown. Alternately, the light-transmissive fibers 15 may pass above or below multiple adjacent fibers to expose or conceal greater lengths of the light-transmissive fibers and, for example, define display regions of differing sizes, shapes, visual characteristics, and so on. Further, it should be appreciated that the light-transmissive fibers may be either warp or weft fibers and may be intermixed with opaque fibers in any pattern desired. Likewise, the spacing between fibers may be varied either between embodiments or within embodiments. Thus, the patterns shown in FIGS. 3-6 are examples rather than limiting As an example, in FIG. 4 the time is displayed as 11:00. That is, region 24, which, in this example is one fiber 15, indicates a "1" because fiber 15 is lit along most of its length and a user would visually recognize it as a "1". Region 25 which is one fiber 15 in this example, is not lit so as to form an unlit space between region 24 and region 26 which is also lit to form a "1". Region 27 includes one fiber which transmits light in four portions 22 to indicate a "colon". Regions 28 and 29 comprise 3 fibers 15 each and are transmit light in various portions 22 to each indicate a "0". Thus, by selectively lighting various fibers 15 and portions 22 thereof, an indication of a time as being 11:00 may be conveyed to an observer.

It should be appreciated that the number of fibers 15 and the portions 22 of those fibers to be lit may be varied to convey the desired information. Each of the fibers 15 may transmit light along its entire length or only portions of the fiber may transmit light as determined by the fiber characteristics, display requirements and various design parameters. The opaque fibers 16 may block or diffuse light transmitted by fibers 15 in order to create the desired design 23. Each area 22 may be thought of as an individual pixel in a display screen and a control device as will be described below may be used to selectively transmit light through various portions 22 of fibers 15 to convey the desired information.

Figure 5:
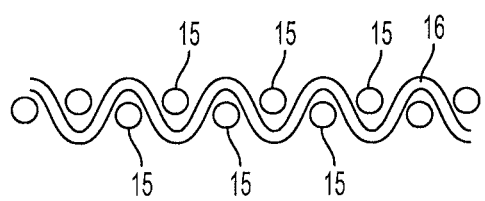
FIG. 5 shows a side view of the woven fabric as viewed from the direction along the line 31 in FIG. 3.
Figure 6:
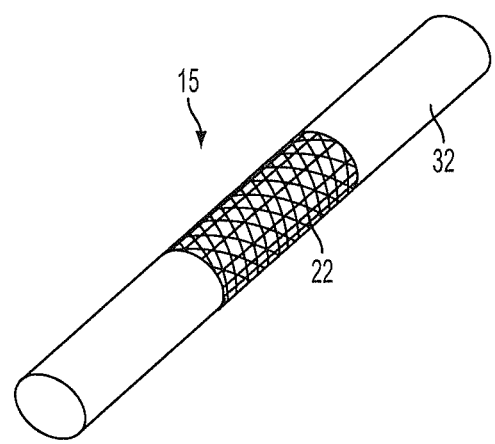
FIG. 6 shows a light transmissive portion and an opaque portion on a light transmissive fiber.

Referring to FIG. 5, a side view of the woven fabric 21 of FIGS. 3 and 4 is shown viewed from the direction along the line 31 in FIG. 3. Light transmissive fibers 15 are shown as the warp and opaque fibers 16 are shown as the weft. Referring to FIG. 6, in one embodiment, a light transmissive fiber 15 is shown with a light transmissive portion 22 and an opaque portion 32. Of course, light transmissive fiber 15 could be light transmissive along its entire length in one embodiment with departing from the scope of the disclosed embodiments. As stated above, the portions of light transmissive fibers 15 which transmit light are determined by the weave and composition of fibers 16 and by the control device, which may be operatively associated with the light transmissive fibers 15 as will be described below.

Figure 7:
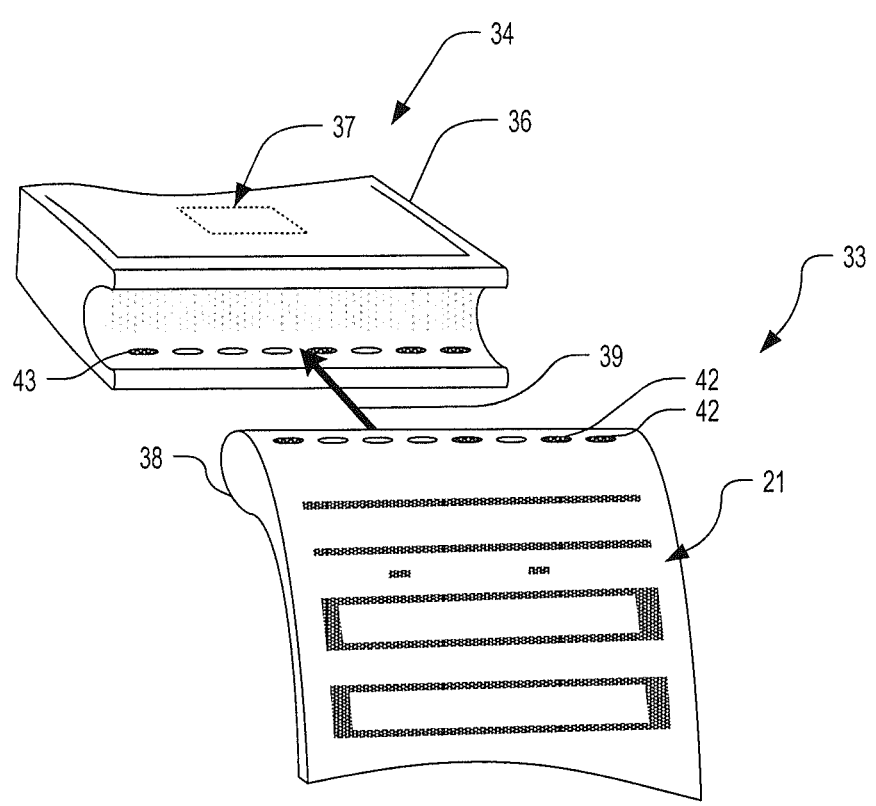
FIG. 7 is a perspective view showing woven fabric as an attachment band to engage with an electronic device.

Referring to FIG. 7, a perspective view of woven fabric 21 is shown as an attachment band 33 which may releasably engage with an electronic device 34 which may, in one embodiment, be a wristwatch. Wristwatch 34 includes a housing 35 which may contain a display 36 and a control device 37. In one embodiment, attachment band 33 may connect to housing 35 by sliding circular band mating portion 38 in the direction of arrow 39 into corresponding circular housing mating portion 41 in housing 35. Of course, the design of mating portions 38/41 may be varied without departing from the scope of the described embodiments; a sliding mechanism, a friction-fit mechanism, a clamp, a pin-and-aperture mechanism and so on are all non-limiting examples of possible attachment mechanisms and the mechanism 38 is shown generally as a result. When band mating portion 38 is inserted into housing mating portion 41, light pipe terminals 42 on mating portion 38 engage with LED sources 43 such that light from LED sources 43 may be transmitted to light transmissive fibers 15 in band 33. In some embodiments, the LEDs may be multicolor LEDs while in others the LEDs may emit only a single color of light, such as white. As will be described below, control device 37 in electronic device 34 may selectively provide light to fibers 15 in order to convey information to a user through woven fabric 21 on band 33.

Control device 37 may execute instructions and carry out operations associated with portable electronic devices as are described herein. Using instructions from device memory, controller 37 may regulate the reception and manipulation of input and output data between components of the electronic device 34. Controller 37 may be implemented in a computer chip or chips. Various architectures can be used for controller 37 such as microprocessors, application specific integrated circuits (ASIC's) and so forth. Controller 37 together with an operating system may execute computer code and manipulate data. The operating system may be a well-known system such as iOS, Windows, Unix or a special purpose operating system or other systems as are known in the art. Control device 37 may include memory capability to store the operating system and data. Control device 37 may also include application software to implement various functions associated with the portable electronic device.

Figure 8:
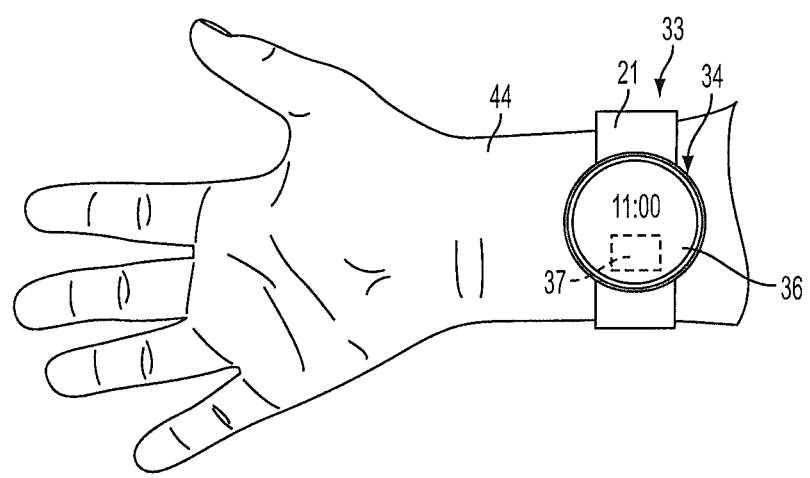
FIG. 8 shows attachment band of FIG. 7 worn on the wrist of a user.
Figure 9:
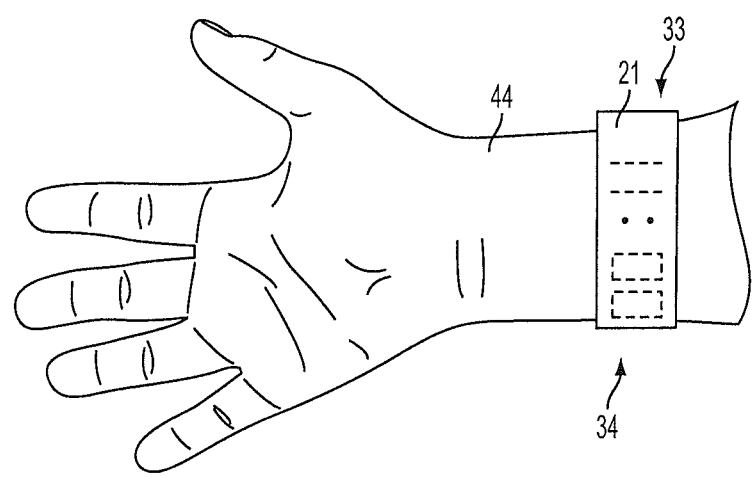
FIG. 9 shows the wristband of FIG. 8 seen from the opposite side of the wrist of user with an information display.

Referring to FIG. 8, an electronic device, which may be the wristwatch 34 described in FIG. 7, is shown as worn on the wrist of a user 44. Flexible attachment wristband 33 which, in one embodiment, includes flexible woven fabric 21 is shown around the wrist of user 44. Electronic device 34 indicates that the time is 11:00 on display 36. Display 36 coincides with display 23 shown in FIG. 4. A control device 37 is included in electronic device. Control device 37 may enable the light transmissive fibers in woven fabric 21 to display information associated with electronic device 34 and/or user 44. Referring to FIG. 9, the wristband 33 of FIG. 8 is shown on the opposite side of the wrist of user 44 from electronic device 34. The time of 11:00 is shown on woven fabric 21 which is part of wristband 33 by directing light from the LED's in electronic device 34 through the light transmissive fibers in fabric 21 as described above. Thus, user 44 may be able to determine the time without looking directly at the display 36 on electronic device and whether or not electronic device display 36 is active. Other information relating to the electronic device 34 or the user 44 may be displayed by control device 37. For example, the temperature or the status of wristband 33 (whether it is securely fastened around user 44 and thus whether it is likely or not to fall off of user 44) or other information may be displayed on wristband 33.

The light-transmissive fibers in woven fabric 21 may be selectively opaque. That is, only certain portions or segments may be designed to emit light externally while other sections are opaque. The light-transmissive fibers may be made opaque by coating them with a light-blocking substance in the opaque regions, as one example.

As another example, the light-transmissive fibers may have a diffraction pattern formed at certain intervals along their lengths. The diffraction pattern may cause light of a particular wavelength to be emitted at or near the pattern, thereby making that section of the fiber light up, glow, or otherwise emit light. Sections or regions that lack such a diffraction pattern may convey light along its length through total internal reflection. Thus, only those areas in which a diffraction pattern is formed may emit light. As an alternative, microlenses, microapertures and the like may be used instead of a diffraction pattern to emit light from the fiber.

As still another option, the fiber may define a set of diffraction patterns, each of which permits light only of a certain wavelength or range of wavelengths to be emitted. Light outside those wavelengths may be transmitted along the fiber rather than being emitted. Accordingly, by controlling the wavelength of the light transmitted from the LED or other light source, the location along the fiber at which the light is emitted may be controlled. As one non-limiting example, a processing unit in an associated electronic device may cause an LED to emit light in varying wavelengths at varying times, thereby causing the light to exit the light-transmitting fiber at different regions or areas, depending on the diffraction patterns of such regions or areas. By rapidly changing the wavelength of the light traveling through the fiber, multiple regions of the fiber may appear to emit light at the same time insofar as the shifts between different light-emitting regions may occur too quickly for the human eye to notice the shift or register any dimming or brightening of such regions. Thus, multiple regions may be simultaneously (or substantially simultaneously) used as part of a single display without requiring all light-emitting regions of the fiber to be simultaneously used. In this fashion, greater control over the display formed by a group of light-emitting fibers may be achieved.

Figure 10:
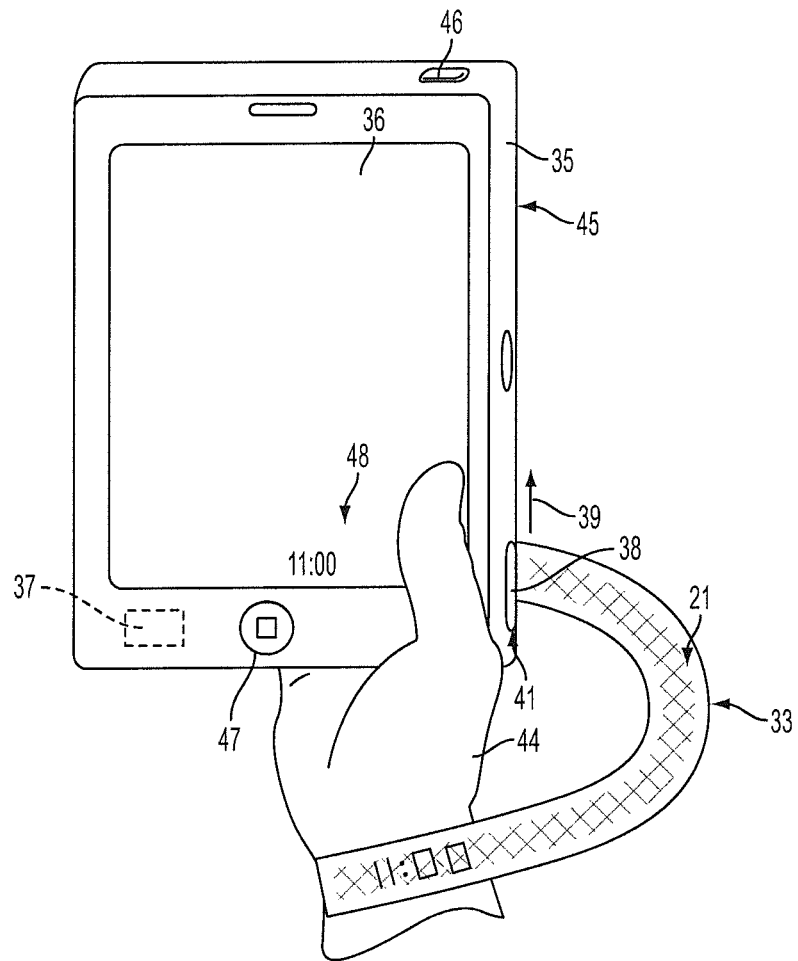
FIG. 10 is a perspective view of an electronic device tethered to a user and including woven fabric display on the tether.

Referring to FIG. 10, a perspective view of an electronic device, which may be a mobile phone or a "smartphone" 45, is shown held by a user 44. The smartphone 45 includes a display screen 36 which may include a touchscreen. The smartphone 45 may also include additional input controls such as an on/off button 46 and a home button 47 on a housing 35. Smartphone 45 also includes a computer control device 37 which may control the content of display screen 36. Display screen 36 may include a time display 48 which could be an analog display or a digital display. In one embodiment, smartphone 45 may be tethered to user 44 directly by attachment band 33 around the wrist of user 44 or band 33 may be attached to another part of user 44 or to the clothing of user 44. Attachment band may include woven fabric 21. Band 33 may releasably engage with housing 35 of portable electronic device 45 as described above with respect to FIG. 7 by sliding circular band mating portion 38 in the direction of arrow 39 into corresponding circular housing mating portion 41 in housing 35. When band mating portion 38 is inserted into housing mating portion 41, light pipe terminals on mating portion 38 engage with LED sources in housing 35 such that light from LED sources in housing 35 is transmitted to light transmissive fibers 15 in woven fabric 21 on band 33. Here, for example, LEDs may be provided on both the top and bottom of the mating aperture. As described above, control device 37 in electronic device 45 may selectively provide light to light pipe fibers 15 in order to convey information to a user through the light pipes 15 in woven fabric 21 on band 33.

In the embodiment shown in FIG. 10, the information conveyed on band 33 is the time (11:00) as is displayed 48 on screen 36. In one embodiment, when electronic device is turned off, band 33 may remain active such that user 44 can determine the time without turning electronic device on. In another embodiment, when an email or text message or voice message is left for user 44 on smartphone 45 while smartphone 45 is turned off (or even while on), information associated with that message may be displayed on band 33 as determined by control device 37. For example, blinking light displays or the like may be used to signal a message waiting to a user, the name or subject of the message may be displayed, a summary of the message, and so on. Thus user 44 may be informed of messages received even while smartphone 45 is turned off. In an alternate embodiment, band 33 may display information associated with smartphone 45 such as remaining battery life and the need to recharge the battery or other information on the status of smartphone 45. Thus, even while smartphone is turned off, selected information may be communicated to user 44 through tether 33. Essentially, any suitable information or data may be conveyed by the woven display. As yet another example, information may "scroll" across the band by updating the display periodically ti show a message that is otherwise too large or long to fit on the woven display all at once.

It should be appreciated that any tether, loop, band, or the like that mates with or attaches to any electronic device may incorporate a woven display, as discussed herein. Thus, for example, embodiments may take the form of a cover or case for an electronic device, a band or strap, a cord (such as a power cord or a cord connecting a peripheral to the electronic device), and so on. Any or all of these may incorporate a woven display as discussed herein.

Figure 11:
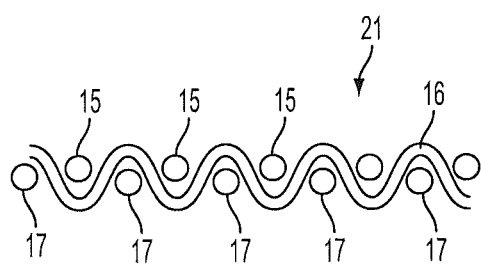
FIG. 11 is a side view of woven material including a third type of filler fiber in addition to light guiding fibers and non-light guiding fibers.

Referring to FIG. 11, in an alternate embodiment, a side view of woven material 21 includes a third type of filler fiber 17 in addition to light guiding fibers 15 and non-light guiding fibers 16. Examples of filler fibers include metal fibers (e.g., strands of steel or copper), glass fibers, and plastic fibers, magnetic fibers, conducting fibers, insulating fibers, or fibers with other material properties. Some filler fibers 17 may be included to exhibit high strength (e.g., polymers such as aramid fibers). Other fibers such as nylon may offer good abrasion resistance or be highly flexible (e.g., to stretch without exhibiting plastic deformation). Fibers 17 may be relatively thin such as carbon nanotubes or carbon fiber or may be thicker such as, for example, metal wire. While fibers 17 are shown alternating with light guiding fibers 15 in the warp of woven material 21, filler fibers 17 could also be included in the weft of woven material 21 alternating with, or in some other configurations replacing, non-light guiding fibers 16. The configuration of filler fibers 17 in the warp or weft of woven fabric 21 may also be varied according to various design parameters depending upon the desired characteristics of the woven material 21.

Figure 12:
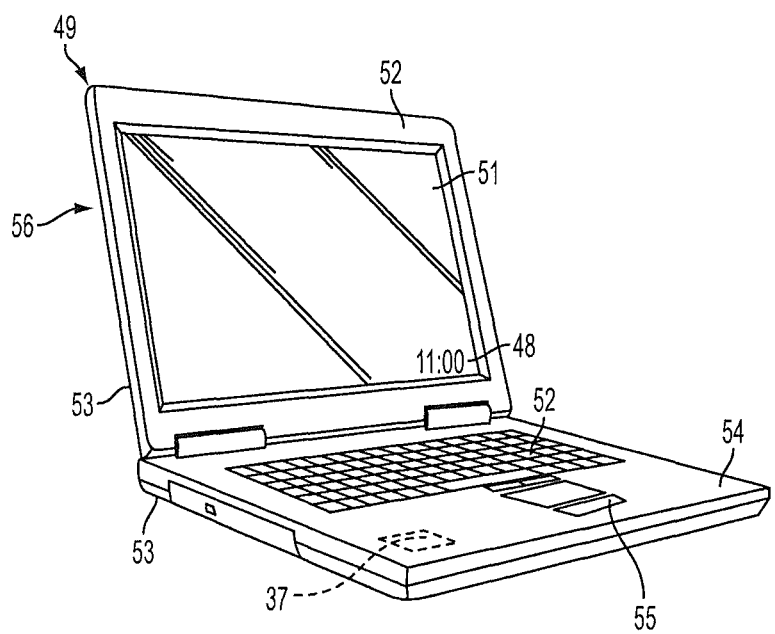
FIG. 12 is a perspective view of a portable laptop computer.

As discussed above with respect to FIG. 2, in an alternate embodiment, post-processing tool 18 could also incorporate resin into the woven fabric 21 to form it into a more rigid material for incorporation into a housing for an electronic device. Referring to FIG. 12, a portable electronic device is shown which may be laptop computer 49. Computer 49 includes a screen 51 on a top portion 52 of a housing 53, and user inputs 55 on a bottom portion 54 of housing 53. A display 48 on screen 51 indicates the time as 11:00. Screen 51 is on the inside of top housing portion 52 and an outside cover surface 56 on the side of top portion 52 opposite to screen portion 51 is not visible in this view. Control device 37 is contained within housing 53 and may control various functions of the computer 49 as described above.

Figure 13:
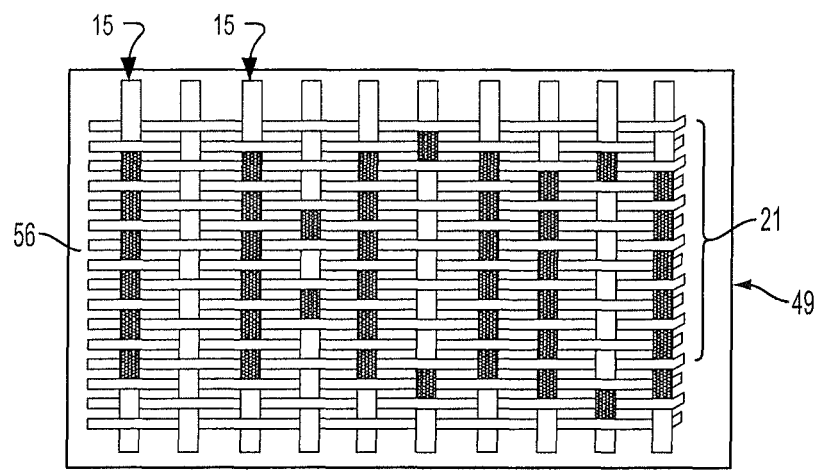
FIG. 13 is a top view of the laptop computer of FIG. 12 in a closed position.

Referring to FIG. 13, the top portion 52 of laptop computer 49 is shown in a closed position. That is, top portion 52 has been closed onto lower portion 54 such that screen 51 is not visible and is contained within housing 53 and outside cover portion 56 is shown. In one embodiment, outside cover portion 56 includes woven fabric 21 that has been invested with a resin such that it is formed as part of housing 53 such that fabric portion 21 is visible to a user. Fabric 21 may also be added to an existing housing as a cover portion. Information, such as the time, 11:00, is displayed by light transmissive fibers 15 in fabric 21 as described above. That is, light transmissive fibers are connected to electronic device 49, either removably as described above, or permanently connected to LED's as part of electronic device 49. As described above, the information displayed may also be other than the time such that information about the status of the electronic device or an indication of messages received or calendar information regarding appointments could be visually conveyed to a user on the outside of electronic device 49 when it is, or is not, otherwise in use. For example, the visible light portions on fabric 21 could blink when a message is received to alert the user to this received message. In an alternate embodiment, fabric 21 is made into a carrying pouch such as a backpack or a purse which may be removably connected to an electronic device contained therein as described above to allow information from the electronic device to be visible to the user on the carrying pouch or backpack when the device is not otherwise visible.

Figure 14:
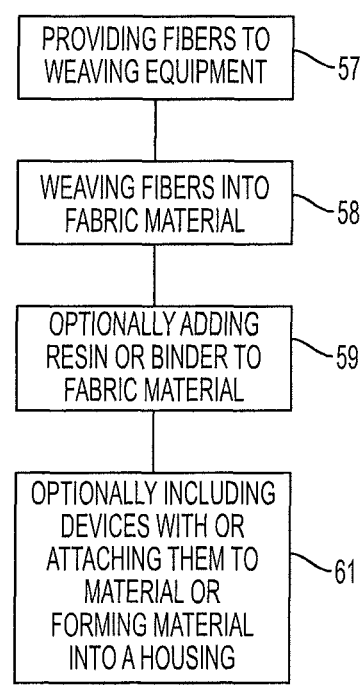
FIG. 14 is a flow diagram of a manufacturing process for making woven fabric and incorporating it into an electronic device.

FIG. 14 is a flow chart of a method for weaving fibers 15, 16, and/or 17 into woven fabric 21 and making fabric 21 an operating display associated with an electronic device. At step 57, equipment 14 may be provided with fibers from one or more different sources of fibers (e.g., fiber sources 15, 16, 17 of FIG. 2). There may be one, two, three, or more than three different types of fiber sources available to a given weaving tool 14. Each fiber may have a different property and may be incorporated into woven fabric 21 in an accurately controlled amount. This allows tools 14 to weave fabrics 21 that have portions with different light transmitting properties. At step 58, tools 14 may be used to weave fibers into appropriate configurations to achieve the desired display configuration. The portions of light transmissive fibers 15 that are made visible in fabric 21 may be thought of as pixels in a screen. Different types of tools may be used for different types of weaving operations. For example, a computer controlled weaving machine may be used to determine the appropriate weaving pattern necessary to convey the desired display information to a user.

During the operations of optional step 59, a resin or binder may be incorporated into fabric 21 to provide controlled amounts of flexibility. For example, binder patterns may include different shapes that provide a smooth transition in the amount flexibility at various points along the length of fabric 21 as necessary to make a wrist band or other type of tether for an electronic device. Binder patterns may also include solid regions on fabric 21 for forming rigid planar structures such as housing walls for a portable computer, handheld electronic device, or other structure. Other regions of fabric 21 may be provided with little or no binder (e.g., in flexible band or pocket where maximum flexibility is desired. After optionally incorporating desired patterns of binder into woven fabric 21, additional processing steps may be performed during the operations of step 61 with post processing tools 19. These operations may include, for example, attaching a clasp to flexible woven fabric 21 to allow its use as a wristband and attaching connectors 38 to fabric 21 to allow its connection to an electronic device as described above. In other post processing operations in step 61, for applications where binder has been infused into fabric 21 to increase rigidity, fabric 21 may be formed into housing portions 53 for use with a portable electronic device.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A watch comprising:
    a housing comprising:
        a housing mating portion; and
        light sources facing the housing mating portion;
    a band comprising:
        a band mating portion comprising light pipe terminals configured to receive light from the light sources when the band mating portion engages the housing mating portion; and
        a fabric, the fabric comprising a plurality of woven fibers, wherein at least some of the fibers are light-transmissive fibers, and wherein each light-transmissive fiber is optically connected to a corresponding one of the light pipe terminals and passes above or below adjacent ones of the light-transmissive fibers to expose or conceal multiple light-transmissive portions within a display region,
    wherein the light-transmissive portions selectively illuminate to create a first illuminated design at a position within the display region, and
    wherein the first illuminated design transitions to a second illuminated design by changing which light transmissive portions are illuminated, the second illuminated design being at a position that is overlapping the position of the first illuminated design.

2. The watch of claim 1, wherein the woven fibers comprises warp fibers and weft fibers,
    wherein some of the warp fibers are light-transmissive fibers, and
    wherein the weft fibers are not light-transmissive fibers.

3. The watch of claim 2, wherein the weft fibers define the light-transmissive portions of the light-transmissive fibers.

4. The watch of claim 1, wherein some of the light-transmissive portions have different sizes from others of the light-transmissive portions.

5. The watch of claim 1, wherein at least one of the first illuminated design and the second illuminated design comprises a representation of alpha-numeric text.

6. The watch of claim 1, wherein at least one of the first illuminated design and the second illuminated design comprises a representation of a current time.

7. The watch of claim 1, wherein the light-transmissive fibers are connected to at least one multicolor light source.

8. A portable electronic device comprising:
    a wristband comprising:
        a wristband mating portion comprising light pipe terminals; and
        a woven fabric forming a display region; and
    a housing comprising:
        a light source configured to direct light through fibers of the woven fabric to illuminate discrete portions of the fibers;
        a processor in electronic communication with the light source; and
        a housing mating portion, wherein the light pipe terminals are configured to receive light from the light source when the wristband mating portion engages the housing mating portion,
    wherein the processor sends signals to the light source to selectively illuminate at least some of the discrete portions of the fibers to create a first illuminated design and to transition the first illuminated design to a second illuminated design located at a same position as the first illuminated design by changing which of the discrete portions are illuminated, wherein each of the fibers passes above or below multiple adjacent fibers to expose or conceal the discrete portions of the fibers.

9. The portable electronic device of claim 8, wherein at least one of the first illuminated design and the second illuminated design comprises a representation of alpha-numeric text.

10. The portable electronic device of claim 8, wherein the fabric is physically connected to the electronic device.

11. The portable electronic device of claim 8, wherein the fabric is a watch band that releasably engages with the housing.

12. The portable electronic device of claim 8, wherein the fabric forms a carrying pouch for the electronic device, and wherein at least one of the first illuminated design and the second illuminated design display information from the electronic device.

13. A method for producing illuminated designs from a fabric of a watch band, the method comprising:

sending a first signal from an electronic device within a watch housing to a light source within a watch housing to selectively illuminate a first set of light-transmissive portions of the fabric, wherein each of the light-transmissive portions is optically connected to the light source when the watch band is attached to the watch housing, wherein fibers of the fabric pass above or below multiple adjacent fibers to expose or conceal discrete portions of the fibers that include the light-transmissive portions;

illuminating the first set of light-transmissive portions to produce a first illuminated design;

sending a second signal from the electronic device to the light source to selectively illuminate a second set of light-transmissive portions of the fabric, wherein the second set comprises different light transmissive portions from the first set; and illuminating the second set of light-transmissive portions to produce a second illuminated design, wherein the first design and the second design overlap at a position of the fabric.

14. The method of claim 13, wherein at least one of the first illuminated design and the second illuminated design comprises a representation of alpha-numeric text.

15. The method of claim 13, wherein at least one of the first illuminated design and the second illuminated design comprises information associated with the electronic device.

16. The method of claim 13, wherein the second signal is sent from the electronic device in response to a notification received at the electronic device, and wherein the second design comprises a representation of the notification.

* * * * *